United States Patent [19]
Griffith

[11] Patent Number: 5,179,413
[45] Date of Patent: Jan. 12, 1993

[54] SYSTEM FOR ILLUMINATING A LINEAR ZONE WHICH REDUCES THE EFFECT OF LIGHT RETROFLECTED FROM OUTSIDE THE ZONE ON THE ILLUMINATION

[75] Inventor: John D. Griffith, Fairport, N.Y.

[73] Assignee: Eastman Kodak Company, Rochester, N.Y.

[21] Appl. No.: 831,730

[22] Filed: Feb. 5, 1992

[51] Int. Cl.$^5$ .................................. G03G 15/04
[52] U.S. Cl. .................................. 355/229; 355/67; 355/71; 362/297; 362/346
[58] Field of Search ........... 355/67, 71, 228, 229, 355/230; 362/3, 297, 346

[56] References Cited

U.S. PATENT DOCUMENTS

| | | |
|---|---|---|
| 3,758,774 | 9/1973 | Hildenbrandt . |
| 3,768,900 | 10/1973 | McLintic . |
| 4,357,075 | 11/1982 | Hunter . |
| 4,473,865 | 9/1984 | Landa . |
| 4,518,249 | 5/1985 | Murata et al. ............ 362/346 |
| 4,595,947 | 6/1986 | Brueggemann . |
| 4,816,875 | 3/1989 | Takeda et al. ............ 362/346 |
| 4,858,090 | 8/1989 | Downs .................... 362/297 |
| 4,871,249 | 10/1989 | Watson . |

Primary Examiner—Monroe H. Hayes
Attorney, Agent, or Firm—M. LuKacher; S. Short

[57] ABSTRACT

An illuminating system, which illuminates a line and translates that line over a document on a platen of a scanner or copier which receives light from the line on an image (photo) receptor thereof, uses primary and secondary reflectors having internal reflective surfaces which are elliptical troughs. An elliptical trough is defined here as a surface having an elliptical cross section and maintaining that same cross section over its length. The primary reflector contains a lamp having a linear filament in a plane containing the major axis of the primary reflector ellipse and located at one of the focii thereof so as to provide a conjugate line for the light from the lamp along a line containing the other of the focii of the primary ellipse reflector. The primary elliptical trough is terminated by an aperture plate having an aperture in which the line is located. A secondary reflector has an internal reflective surface with a slit facing the document to be illuminated. The secondary reflector has focii, one of which is common with one of the focii of the first reflector located in the aperture while the other focii is along a line in the plane of the document being illuminated. The aperture is sized so that light retroreflected from the document in the image plane on the secondary reflector does not enter the primary reflector and affect the light emanating from the primary reflector which illuminates the line on the document.

11 Claims, 4 Drawing Sheets

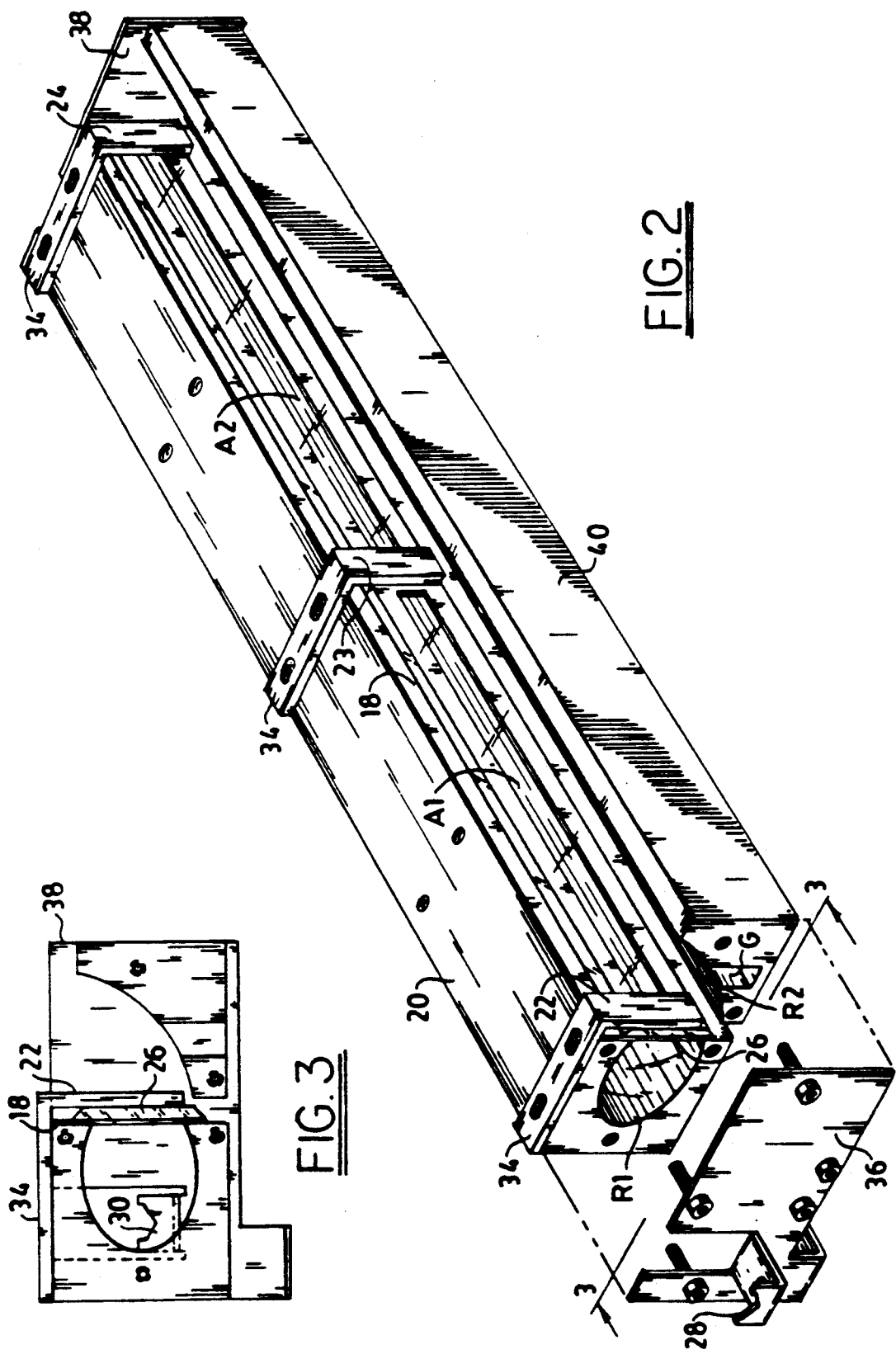

SYSTEM FOR ILLUMINATING A LINEAR ZONE WHICH REDUCES THE EFFECT OF LIGHT RETROFLECTED FROM OUTSIDE THE ZONE ON THE ILLUMINATION

DESCRIPTION

The present invention relates to illuminating systems and particularly to a system for illuminating a linear zone in an image plane at which a document may be disposed so as to obtain an optical representation of a linear zone of the document.

The invention is especially suitable for use in an electrophotographic reproduction device or scanner which translates the optical representation of the illuminated linear zone into a digital signal which may be processed and retranslated into images by electrophotographic or other printing techniques. Aspects of the invention will be found generally useful whenever a linear zone is to be illuminated.

The scanning or reproduction of color images requires illumination, the color content or spectrum of which do not change from line to line or from scan to scan. Often times the illuminating light is white light in which the primary colors are accurately balanced. Changing this balance adversely affects the quality of the reproduced images and precludes faithful reproduction thereof. An infinitely narrow line of illumination cannot practically be projected on an image plane. Because of the finite size of lamp filaments and because of diffusion effects, a zone is illuminated. This zone may overlap adjacent portions of a document of different color. The retroreflection or "bleeding" of light from these adjacent areas into the illuminating system can result in a change of the color balance of the illumination. The change in color balance is difficult to compensate, since it depends upon the color of the retroreflected light which varies continually in each document and from document to document. The problem of reducing the bleeding effect is exacerbated by mechanical constraints, since the illumination system and/or the platen on which the document is disposed must move relative to each other in order to illuminate successive lines on the document from the top to the bottom thereof. Thus, merely placing a hard aperture at the image plane to block either illumination or retroreflection outside of a narrow zone is unsatisfactory since the device providing the aperture must move with the illuminating system and/or the document carrier (the platen). Space constraints militate against the use of such hard aperture devices.

An illuminating system of the type which is presently in use for illuminating a linear zone on an image plane at which a document is disposed has been provided by a reflector which is an elliptical trough having one of its focii in the image plane. A lamp having a linear filament is located at the other end of the focii. Since the focii are optically conjugate, the image of the lamp filament appears in the image plane. The zone which is illuminated depends upon the curvature of the elliptical segment surrounding the lamp and the size (the diameter) of the filament of the lamp. Light outside of the desired zone width is retroreflected back into the reflector where it mixes and changes the color balance of the illumination from the lamp. While such an illuminating system is sometimes satisfactory for black and white reproduction, quality and accurate color reproduction or digitization of color images militates against use of such a system.

Accordingly, it is the principal object of the present invention to provide an improved illuminating system which illuminates a linear zone in an image plane at which a document may be located for reproduction or scanning and which reduces variations in the illumination due to bleeding or retroreflection into the illuminating light from outside the zone.

It is another object of the present invention to provide an improved illuminating system especially suitable for illuminating objects from which color images are to be derived which reduces the adverse effects of bleeding or retroreflected light from the image without wasting the illuminating light and severely reducing the intensity of the light projected onto the image.

It is still another object of the invention to provide an illuminating system for illuminating a linear zone of a document for reproduction or scanning thereof which does not adversely affect the transportability of the system so that it can move with respect to the document to scan successive along the length thereof.

Briefly described, a system for illuminating a linear zone on an image plane, which may contain a document to be scanned or reproduced, utilizes primary and secondary reflectors. Each reflector is a segment of an elliptical trough which define focii lines parallel to the zone to be illuminated. The primary reflector contains a lamp having a linear filament extending along one of its focii which is surrounded by the reflective surface thereof. The secondary reflector reflects light from the primary reflector to the zone on the image plane. The secondary reflector and the primary reflector have focii in common which extend along the line. This line is contained in an aperture of an aperture plate which terminates the primary reflector. The aperture is sized in width so that retroreflective light from outside the zone on the image plane is intercepted and does not enter the aperture thereby avoiding mixing with the light from the lamp and adversely affecting the color balance of the illumination of the zone.

The foregoing and other objects, features and advantages of the invention as well as a presently preferred embodiment thereof will become more apparent from a reading of the following description in connection with the accompanying drawings in which:

FIG. 2 is a perspective view, partially in section, of the assembly of primary and secondary reflectors in accordance with a presently preferred embodiment of the illuminating system of the invention;

FIG. 3 is an end view of the assembly shown in FIG. 2 along the line 3—3 in FIG. 2;

Figure 1:
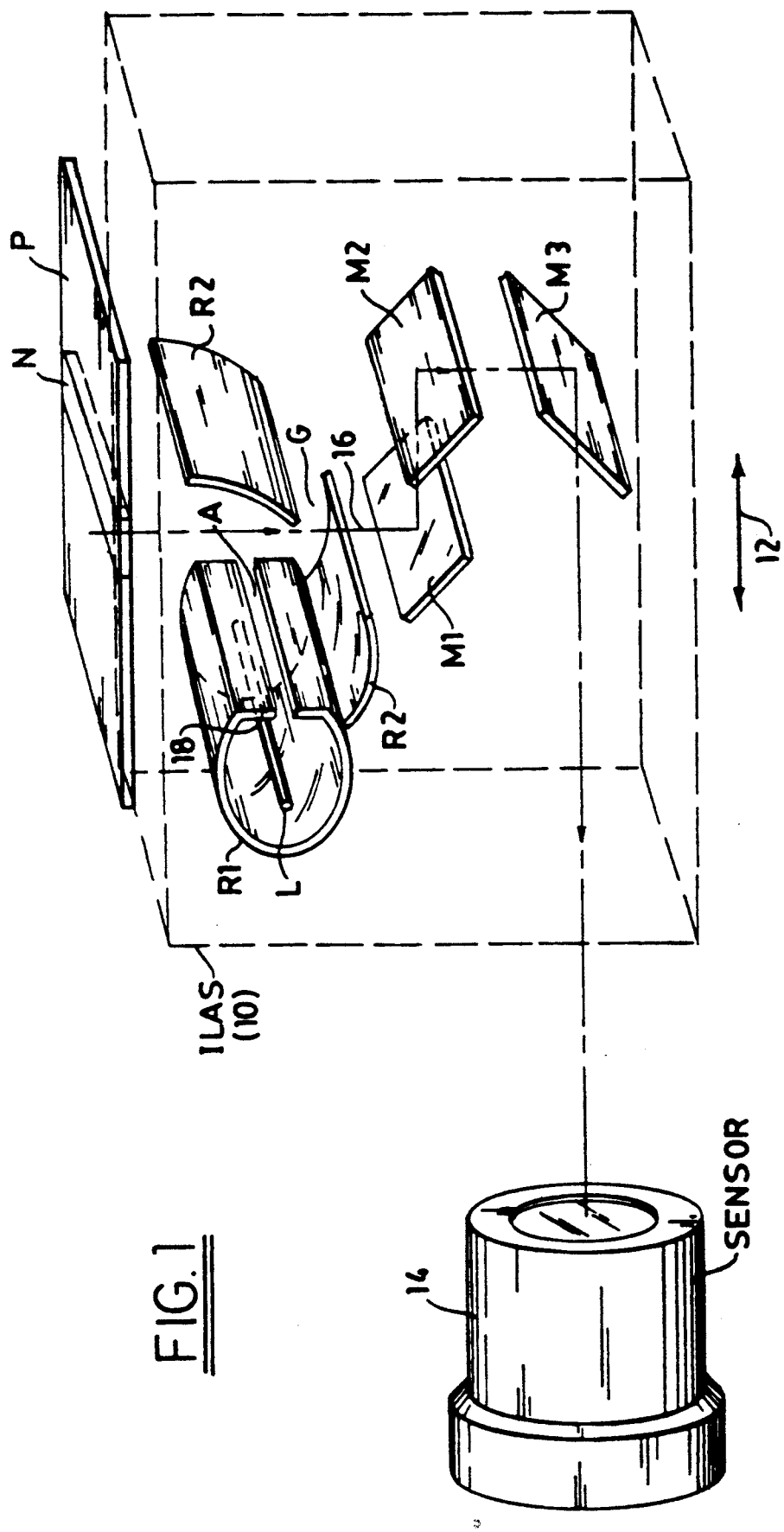
FIG. 1 is a perspective view schematically illustrating an illuminating system embodying the invention.

Referring to FIG. 1, there is shown an assembly 10 defining the illuminating system provided in accordance with the presently preferred embodiment of the invention which illuminates a linear zone N extending across the width of a transparent platen P. A document can be disposed on the platen. Below the platen is an illumination assembly (ILAS) 10 which moves in the direction shown by the arrows 12 so as to translate the zone across the image bearing member (document) on the platen P. The mirrors M2 and M3 are translated at a different rate than the other components in order to maintain focus of the sensor assembly, 14, as the document is scanned. The assembly includes folding mirrors M1, M2 and M3 which direct light from the zone, which is reflected from the document, to a stationary sensor 14. This sensor may be a CCD (charge coupled photo diode) array. The sensor effectively scans the image in a direction across the zone so as to provide digital signals. The sensor is a representative image (photo) receptor and, for example, an electrophotographic processor, such as used in copiers. The processor operates to provide a copy on paper which is fed through the copier. The illustrated lens/sensor array 14 may be part of a digital scanner. The digital signals then are applied to a raster image processor (RIP) which enables the image to be changed, combined with other graphic information and the like. The output of the RIP may be applied to a digital printer, such as the modulators of a laser printer or image setter. A copier embodiment utilizes the laser output to form an image in a electrophotographic processor which produces copies (after modification of the scanned image in the RIP if desired) on paper fed through the copier.

The illuminating system has a primary reflector R1 and a secondary reflector R2. The secondary reflector has a gap or slit G through which light from the illuminated zone passes in a direction indicated by arrows on a line 16. This light is incident on the first mirror M1 of the optical system provided by the mirrors, M1, M2 and M3. The light is folded by these mirrors and projected to the lens/sensor array assembly 14.

The primary reflector R1 has an elliptical trough surface which is internally reflective. The end of this surface is closed and encloses a long (linear) filament lamp L. The lamp is located at one focus of reflector R1. The elliptical surface of the primary reflector R1 is closed by a plate 18 having an aperture A therein. The plate 18 is located in a plane which is normal to the major axis of the elliptical surface of the primary reflector R1 and also contains the second focus of that surface. This aperture is bisected by the plane defined by the major axis of the ellipse of the primary reflector R1 and the lamp L. The other focii of the primary reflector then is located in the middle of the aperture A. Both focii of the primary reflector R1 are long lines paralleling the illuminated zone N.

The secondary reflector R2 is a segment of an elliptical trough having an internally reflective surface which faces the plate 18. The surface faces the zone N and reflects light from the lamp L which passes through the aperture A to a focus in the image plane (where the image bearing document is located) on the platen P. The position of this image plane must be adjusted for the equivalent air thickness of the platen, which is given by its thickness divided by its refractive index. One of the focii of the secondary reflector R2 is located in the zone N on the image plane while the other is common with the focii of the primary reflector R1. In other words, the common focii are along the same lines which extends centrally across the length of the aperture A.

The ellipse of the primary reflector R1 has a major axis (assuming that the ellipse was used in full rather than a segment thereof terminated by the plate 18) which is longer than the major axis of the ellipse of the secondary reflector R2 (again assuming that the secondary reflector R2 ellipse was a complete surface). The major axis of the secondary reflector ellipse may for example be almost twice as long as the major axis of the primary reflector ellipse. Then, the zone which is illuminated has a width approximately four times the diameter of the filament of the lamp. The lamp may for example be a conventional linear filament lamp, such as the Gilway L9111 or L9112 sold by the Gilway Company of Waburn Ma. or a segmented filament lamp such as the QR series manufactured by the Ushio corporation of Tokyo, Japan.

Figure 4:
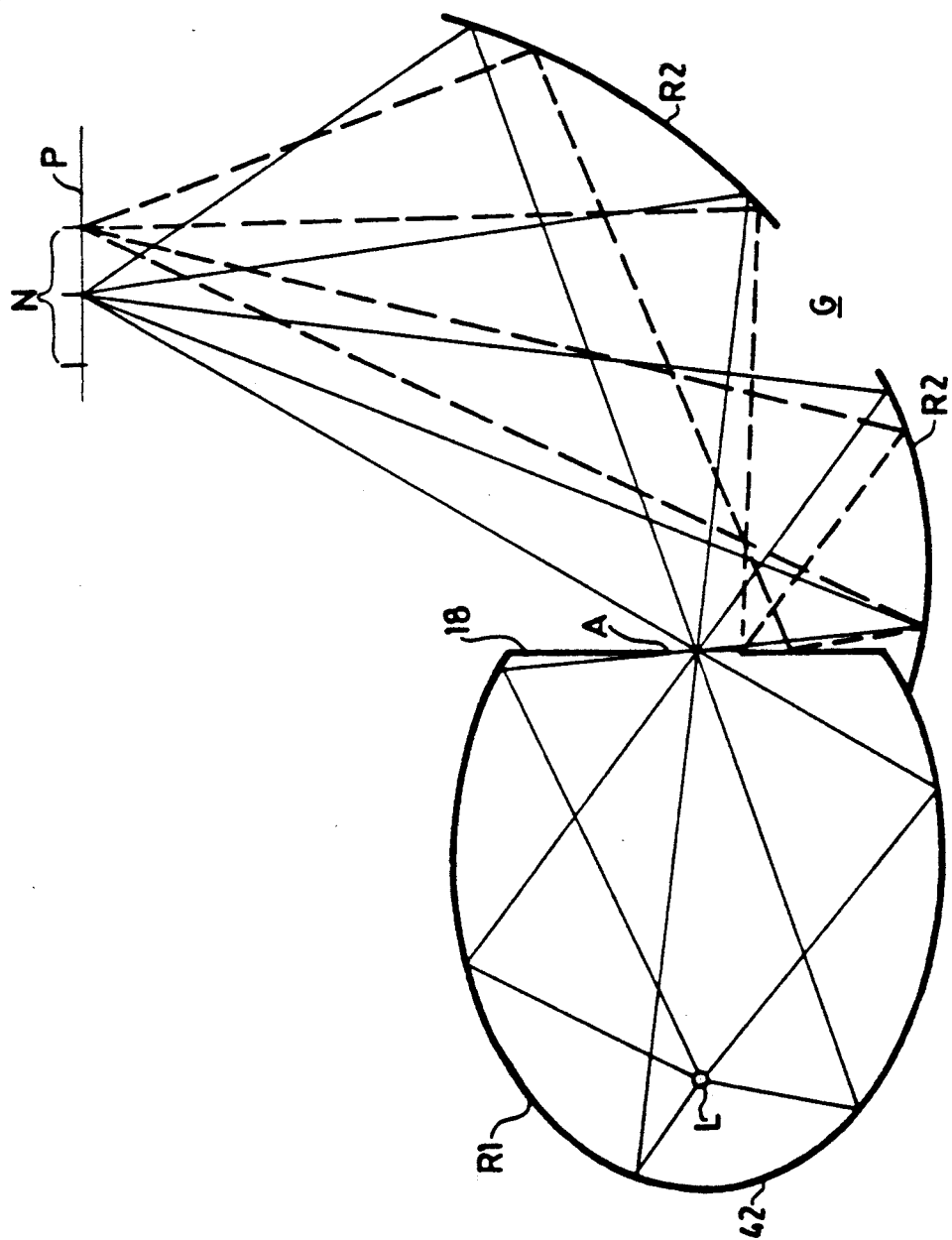
FIG. 4 is a ray diagram illustrating the operation of the illuminating system shown in the preceding figures.

As will become more apparent from FIG. 4, the aperture A has a width which prevents light retro-reflected from outside the width of the zone from entering the primary reflector R1. This retro-reflected light or bleeding is preferably absorbed by the exterior surface of the plate 18, which may be coated with light absorbing material (e.g., black paint) The aperture A in the location along the common focii of R1 and R2, reduces the amount of retro-reflected illumination which is present inside the primary reflector R1. Mixing of the retro-reflected illumination with the primary illumination from the lamp L is thus substantially avoided. The color balance of the illumination in the zone N is then primarily due to the spectrum of the lamp, and is preferably white light with the primary colors in balance to assure accurate reproduction of the image on the platen P. Any slight bleeding into the primary reflector R1 may be compensated electronically in the processor (the RIP) associated with the sensor array or in digital filters which condition the digital signals from the said sensor array.

FIGS. 2 and 3 illustrate an assembly of the primary reflectors R1 and R2 in a body which may be part of the ILAS 10. The elliptical trough surface of the primary reflector is a bore in a block 20. This block is terminated by the aperture plate 18. In the assembly, the aperture plate is somewhat flimsy and is provided with two spaced rectangular apertures indicated at A1 and A2 in FIG. 2. The aperture plate is clamped against the forward wall of the block 20 by clamp plates 22, 23 and 24 which are legs of "L" shaped brackets; the other legs being indicated at 34. The clamp plate 23 is disposed in the area between the apertures A1 and A2. These plates 22, 23 and 24 may be made of transparent materials, such as glass since the apertures A1 and A2 may extend into the area covered by these plates 22 and 24. The plates 22 and 24 also clamp (sandwich) a thermal guard plate 26 also of transparent glass, which blocks heat radiated in the direction of the secondary reflector R2). Brackets 28 and 30 (part of side plates 36 and 38) are attached to the side walls of the block 20. These brackets support the lamp L. The lamp is not shown in FIGS. 2 and 3. The legs 34 are slotted to enable the clamp plates 22, 32 and 34 to be attached by bolts to the top of the block 20 at positions where they apply clamping force for assembling the thermal guard plate 26 and the aperture plate 18 onto the front wall of the block 20.

The side plates 36 and 38 attach to the block 20 of R1, another block 40 which provides the secondary reflector R2. This block 40 has a slit providing the gap G through which light reflected from the image bearing member on the platen P (FIG. 1) passes into the optical system of the mirrors M1, M2 and M3 and is folded and projected to the sensor array 14.

Referring to FIG. 4 the reflectors R1 and R2 and the image plane, which is at the bottom surface of the platen P, are indicated. The lamp L is located at one of the focii of the elliptical surface of the primary reflector R1, while the aperture has its midpoint at the other of the focii of the reflector R1. These focii are along the major axis of the elliptical surface providing the reflector R1. This major axis is in a plane containing the line focii at the elliptical trough of which FIG. 4 is a cross section; the plane being parallel to the zone N which is illuminated. The lamp L is spaced from the closed end or vertex 42 of the elliptical segment defining R1. The distance between one of the focii where the lamp is located and the end 42 along the major axis of the R1 elliptical segment is much greater than the diameter of the filament. Preferably the diameter of the filament is 10% of the distance along the major axis from the apex end 42. There is therefore a fan of rays from the lamp which are reflected and are focused at the conjugate distance along the major axis of R1 which is at the center of the aperture A. In other words, the major axis bisects the aperture A. There are of course several rays only a few of which are shown to simplify the illustration. Some of these rays go through the aperture and reach the center of the zone N. Others pass through the aperture and are reflected by the segment of the R2 ellipse. Since the center of the aperture and the center of the zone N are at the two focii of the R2 ellipse, the R2 ellipse focuses the rays at the center of the zone. Because of the finite size of the lamp, the illuminated zone spreads in width. Say for a lamp of one millimeter filament diameter, the zone is approximately four millimeters in width. In this example, the major axis of the secondary ellipse R2 is about twice as long as the major axis of the primary ellipse R1.

The dash lines show the retro-reflected light at the limit of the zone N (outside the width of the zone). These dash lines terminate outside of the lower end of the aperture A. This illustrates that light from outside the zone is blocked by the aperture plate 18 and absorbed before entering the confines of R1. The bleed of colors of undeterminate hue into the primary reflector R1 is therefore reduced and the color balance of the illumination is preserved.

Figure 5:
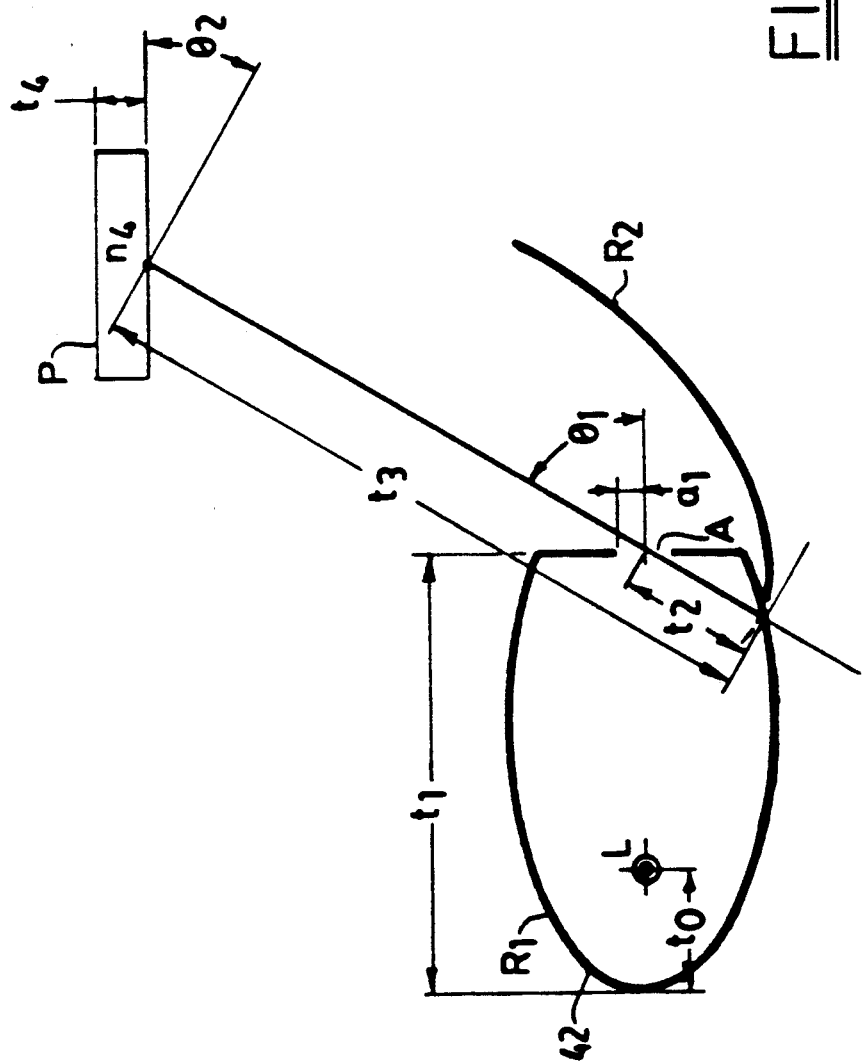
FIG. 5 is schematic diagram indicating the parameters of an exemplary illuminating system embodying the invention.

Referring to FIG. 5 there is shown an exemplary design of an illuminating system where the various parts and dimensions are labelled. It should be understood that this design is an example of a presently preferred embodiment and that an illuminating system in accordance with the invention may have different sizes and dimensions. In the exemplary design, the length of the semi-major axis of the primary ellipse R1 is 17.250 mm. The semi-minor axis (the axis perpendicular to the major axis along a bisector of the ellipse between its vertices) of the primary reflector is 13.080 mm. The secondary reflector has a semi-major axis 30.000 mm in length. The semi-minor axis is 23.420 mm in length. The distance from the lamp to the vertex is $t_0$ which is $-6.04$ mm. The distance from the vertex to the aperture of the primary reflector is $t_1$. $T_1$ is 28.496 mm. The distance $a_1$ which is half the width of the aperture is 2 mm. $\Theta_1$ is 60°. The distance $t_2$ between the focii at the center of the aperture A and the imaginary vertex of the second ellipse is $-11.252$ mm. $t_3$, which is the distance from the vertex of R2 to the platen, is 44.603 mm. The angle with the image plane at the bottom of the platen P, $\Theta_2$ is 30°. $t_4$ which is the thickness of the transparent platen P is 6.30 mm. The index of refraction of the platen material is 1.52. The length of the various components perpendicular to the drawing is 300 mm. The sag of the ellipses is described by the following equation:

$$Z = \frac{cy^2}{1 + \sqrt{1 - c^2(K+1)y^2}} \quad o \leq Z \leq b$$

$$Z = \frac{cy^2}{1 - \sqrt{1 - c^2(K+1)y^2}} \quad b < Z \leq 2b$$

where b is the length of the semi-major axis and Z and y are the distances to the location of a point on the ellipse along and perpendicular thereto, respectively from the vertex, where $y = Z = o$. In the case of the primary ellipse c is 0.100826 mm$^{-1}$ and K equals $-0.42504$. For the secondary ellipse c is 0.54695 mm$^{-1}$. K is $-0.390560$.

From the foregoing description it will be apparent that there has been provided an improved illuminating system which is especially adapted for use in illuminating a linear zone in the plane of an image, which zone can be translated across the image so as to view successive lines across the image. Variations and modifications in the herein described system, within the scope of the invention, will undoubtedly suggest themselves to those skilled in the art. Accordingly the foregoing description should be taken as illustrative and not in a limiting sense.

I claim:

1. A system for illuminating a linear zone on an image plane which comprises primary and secondary reflectors each being elliptical troughs and each having first and second focii which extend along lines parallel to said zone, said second of said focii of said primary reflector and said first of said focii of said secondary reflector being common and extending along the same line, said second focii of said secondary reflector being in said zone, a lamp extending along a line in common with said first of said focii of said primary reflector, a plate terminating said first reflector and extending along the plane containing said same line, said plate having an aperture containing said same line, and said aperture having dimensions to prevent light from regions of said image plane outside said zone from being retroreflected through said aperture into said primary reflector.

2. The system according to claim 1 wherein said secondary reflector has a slit opposite to said image plane through which light reflected from said zone can pass.

3. The system according to claim 2 further comprising an image receptor, and an optical system for directing light passing through said slit to the photo receptor.

4. The system according to claim 3 wherein said optical system includes a plurality of folding mirrors.

5. The system according to claim 1 further comprising means for locating an image bearing surface in said image plane, an assembly containing said reflectors and said lamp, which assembly is movable with respect to said image bearing member for translating said zone over said image bearing member.

6. The system according to claim 5 wherein said assembly includes said optical system, said assembly and said locating means being movable with respect to each other for translating said zone in a direction perpendicular to the length thereof.

7. The system according to claim 1 wherein said aperture is a rectangular slit having a length and a width, said zone being generally rectangular and having a width and a length, said width of said zone and said width of said aperture slit being approximately equal.

8. The system according to claim 1 wherein said primary reflector elliptical surface is an internal surface containing said first of said focii of said primary reflector spaced from an end thereof along a major axis of said primary reflector's elliptical surface, said lamp having a filament, said filament having a diameter and extending along said first of said focii of said primary reflector and said filament diameter being approximately ten percent of the distance between said end and said first of said focii of said primary reflector.

9. The system according to claim 1 wherein the surface of said plate facing said second reflector is characterized as being light absorptive.

10. The system according to claim 1 wherein said elliptical trough providing said primary reflector has a first major axis, and said elliptical trough defining said secondary reflector has a second major axis, said second major axis being longer than said first major axis.

11. The system according to claim 10 wherein said second and first major axes lengths are approximately in the ratio of 30 to 17.

* * * * *